United States Patent [19]

Showalter

[11] 3,807,050

[45] Apr. 30, 1974

[54] THREE-DIMENSIONAL PROTRACTOR

[76] Inventor: Scott M. Showalter, P.O. Box 462, Garden City, Kans. 67846

[22] Filed: July 20, 1971

[21] Appl. No.: 164,377

[52] U.S. Cl............... 33/180 R, 33/174 N, 33/286
[51] Int. Cl. .......................... G01c 1/00, G01b 5/25
[58] Field of Search............ 33/1 R, 1 E, 1 N, 1 CC, 33/1 SA, 21 C, 174 N, 75 B, 97, 75 R, 180 R, 84, 274, 286, 227

[56] References Cited
UNITED STATES PATENTS

| | | | |
|---|---|---|---|
| 1,134,106 | 4/1915 | Clarke | 33/1 CC |
| 1,317,670 | 9/1919 | Upson | 33/281 |
| 404,451 | 6/1889 | Waggoner | 33/118 |
| 2,431,100 | 11/1947 | Woods | 33/174 N |
| 2,830,374 | 4/1958 | Aivaz | 33/174 G |
| 2,563,599 | 8/1951 | Gardner | 33/174 N |
| 2,899,750 | 8/1959 | Becroft | 33/75 |

Primary Examiner—Robert B. Hull
Assistant Examiner—Richard R. Stearns
Attorney, Agent, or Firm—Sughrue, Rothwell, Mion, Zinn & Macpeak

[57] ABSTRACT

A three-dimensional protractor for determining two angular dimensions and one linear dimension for an angular member having one leg attached to a first point and a second leg extending axially toward a second spaced-apart point. The protractor includes a mounting means having a first angle indicia thereon and a movable aligning pointer connected to the mounting means by a slidable shaft for determining a second angular relationship between the pointer and shaft, the shaft being movable axially relative to the mounting means and having a linear measurement indicia thereon for obtaining a linear dimension between the mounting means and the aligning pointer.

6 Claims, 6 Drawing Figures

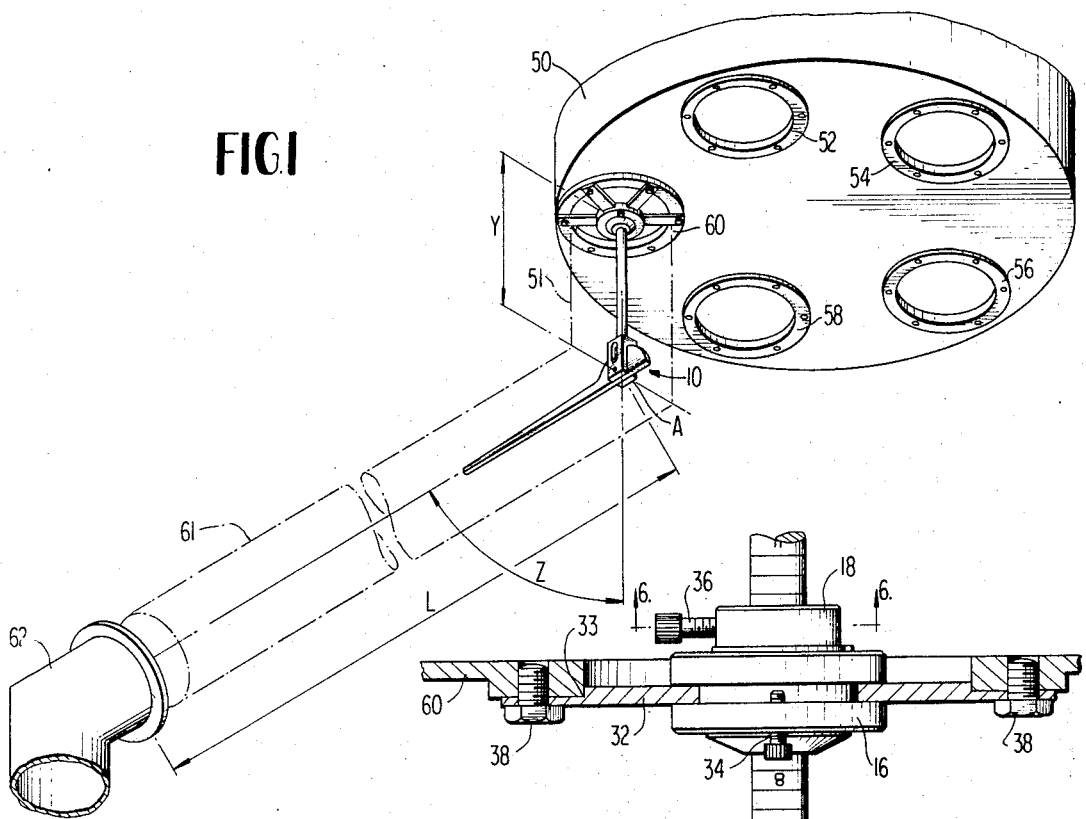

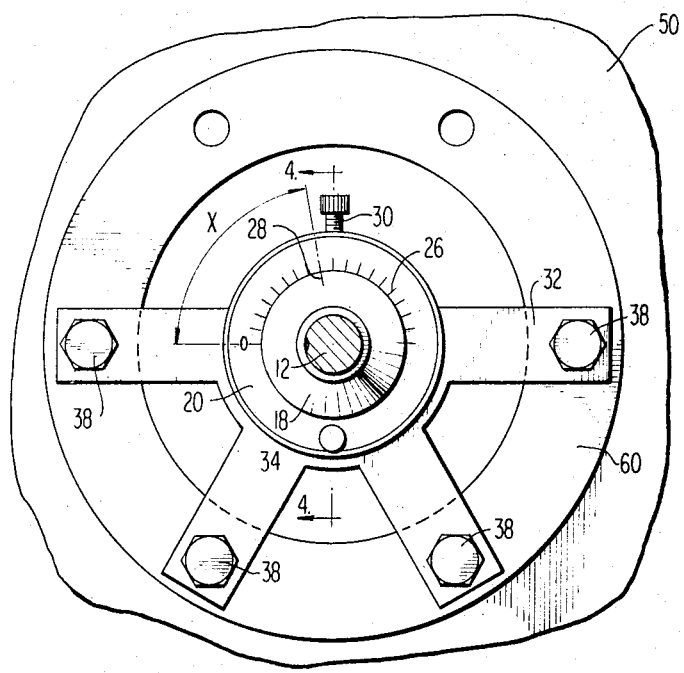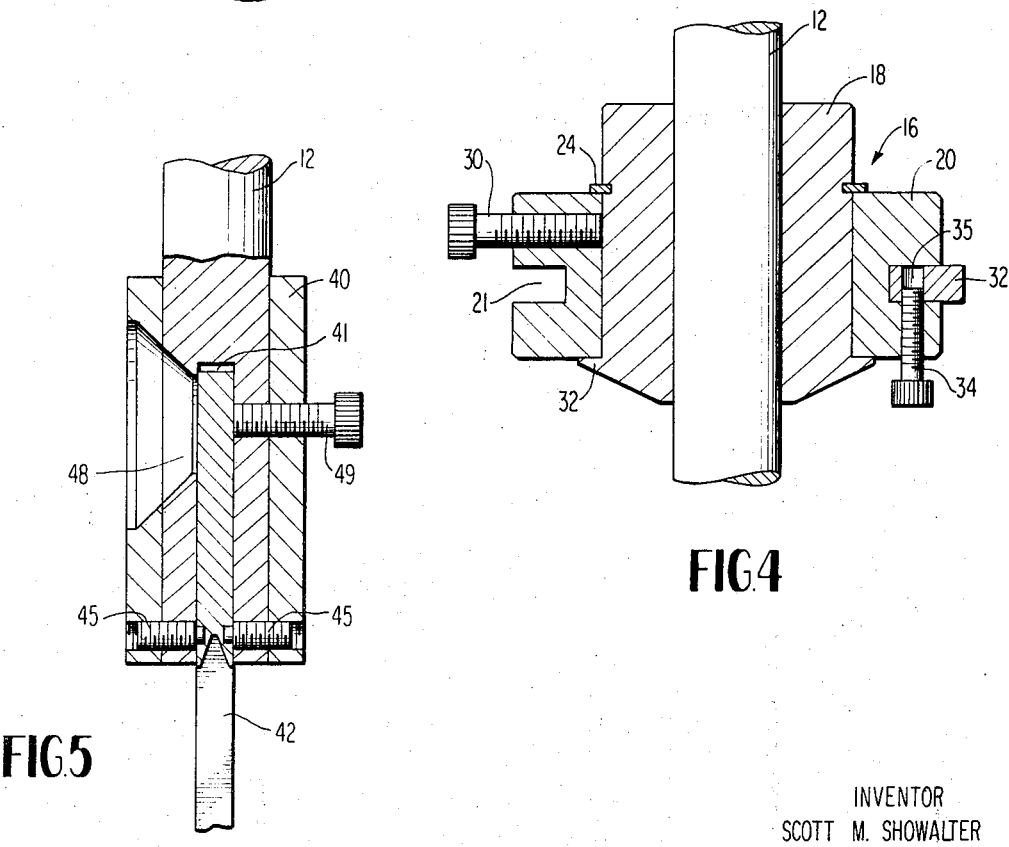

3,807,050

THREE-DIMENSIONAL PROTRACTOR

BACKGROUND OF THE INVENTION

1. Field of the Invention

The present invention relates to a three-dimensional protractor for aligning an angular member, such as a downspout of a grain or feed distributor, with a distant point to obtain accurate angular and linear dimensions for constructing a spouting run which will accurately fit between the distributor outlet and the remote point.

2. Description of the Prior Art

In the prior art, no devices were available for accurately determining the dimensions required for constructing an elbow and downspout pipe for conveying grain or feed from an outlet hole in the distribution bonnet of a feed mill to a remote point, thus requiring an elbow and downspout pipe to be constructed by the trial and error method. Those measuring devices which could conceivably be adapted or modified for this use are too complex, too cumbersome or too costly to be of any practical value for this use.

The closest prior art devices for determining dimensions in pipe construction employ two leg members pivoted together with a protractor-type scale surrounding the pivot point for obtaining a single angular dimension between two angularly disposed pipes. However, this prior art device does not provide for obtaining a second angular dimension of the angular pipe relative to a mounting flange or a means for determining the required axial length of one of the legs of the elbow being constructed.

SUMMARY OF THE INVENTION

One of the objects of the present invention is to provide a three-dimensional protractor for obtaining two angular dimensions and a linear dimension for constructing angled conduits.

Another object of the present invention is to provide a three-dimensional protractor for accurately aligning one leg of an angled member attached to a distribution outlet with a remote point and obtaining the necessary dimensions for constructing the angled member and overall connection between the two points.

A further object of the present invention is to provide a three-dimensional protractor having two angular scales and a linear scale for constructing an angular conduit member that is simple in construction, inexpensive and easy to use.

A further object of the present invention is to provide a three-dimensional protractor device for obtaining the necessary dimensions for constructing a spouting run having a flanged elbow at one end thereof between an outlet of a feed or grain distributor and a remote point or connection.

These and other objects and advantages of the present invention will be seen from the following description of the drawings and the preferred embodiment thereof.

BRIEF DESCRIPTION OF THE DRAWINGS

FIG. 1 is a perspective view of the three-dimensional protractor device according to the present invention being used to determine the various angular and linear dimensions necessary for constructing the downspout run between a feed or grain distributor and a remote connection point;

FIG. 2 is a detailed assembly of the three-dimensional protractor according to the present invention;

FIG. 3 is a sectional view taken along the line 3—3 of FIG. 2;

FIG. 4 is a sectional view taken along the line 4—4 of FIG. 3;

FIG. 5 is a sectional view taken along the line 5—5 of FIG. 2;

FIG. 6 is a sectional view taken along the line 6—6 of FIG. 2.

DESCRIPTION OF THE PREFERRED EMBODIMENT

Referring now to FIG. 2, the three-dimensional protractor assembly 10 according to the present invention includes a shaft means or rod 12, having a linear scale 14 scribed or printed thereon, with the scale 14 preferably being dimensioned to the nearest one-quarter inch, being movably mounted in rotatable collar or turntable assembly 16. As shown in FIG. 4, the turntable or collar assembly 16 includes an inner rotatable member 18 rotatably retained in an outer retaining member 20 by means of a flange 32 formed at one end of the inner rotatable member 18 and a snap ring 24 positioned in a groove in the inner rotatable member 18 on the opposite side of the outer retaining member 20. The linearly dimensioned shaft member 12 extends through an opening in the center of inner rotating member 18 and can be locked to prevent axial movement relative to the inner member 18 by means of a lock screw 36 threaded into the inner member 18, as shown in FIG. 6. If desired, a ball 37 may be positioned between the end of the lock screw 36 and a curved depression 13 formed axially along the length of the shaft member 12 to maintain proper alignment between the shaft 12 and the inner rotatable member 18 for reasons to be described hereinafter.

Referring to FIG. 3, an angular scale 26 marked in angular increments between 0° and 180°, or 360°, if desired, is located on the lower surface of the outer retaining member 20 adjacent the flange 22 of the inner rotatable member 18. An indicating mark or line 28 is cut or scribed radially on the flange 22.

The outer retaining member 20 has a groove 21 formed about the outer circumference thereof, as shown in FIG. 4, for attaching a flange plate 32 to the protractor assembly 10. The flange plate 32 is adapted to be bolted to a flanged outlet opening 60 of a grain distributor 50 by any desired attaching means such as bolts 38, as shown in detail in FIGS. 1 and 3. As seen in FIG. 4, the flange plate 32 is retained in groove 21 of the outer retaining member 20 by means of a lock screw 34 which engages a hole or depression 35 in the flange plate 32 to maintain proper positioning of the outer retaining member 20 relative to the flanged outlet opening 60 or similar opening, shown in FIG. 1.

The end of the shaft 12 extending away from the turntable assembly 16 has a sighting and aligning pointer 42 pivotally attached thereto at 44, as shown in FIG. 2. Referring now to FIGS. 2 and 5, a mounting member 40 is attached to the end of the shaft 12 by any desired means, such as welding, brazing, etc. In the preferred embodiment shown in FIG. 5, the mounting member 40 has a bore therethrough corresponding to the diameter of the shaft 12, with the shaft 12 being positioned therein and retained by means of set screws 45 and a lock screw 49. The pointer 42 has an enlarged curved portion 43 formed on one end thereof, as shown in FIG. 2. An angular scale 46 is scribed or marked on the enlarged portion 43 to form an angle measuring protractor means. The enlarged curved portion 43 of the pointer 42 is positioned in a slot 41 cut longitudinally in the mounting member 40 and the end of the shaft 12, as seen in FIG. 5. The pointer 42 is pivotally retained in the slot 41 by means of the two set screws 45 which are threaded into the mounting member 40 and the shaft 12.

As seen in FIGS. 2 and 5, a window or scale reading opening 48 is formed in the side of the mounting member 40 and through the shaft 12 to allow the angular scale 46 marked on the enlarged curved portion 43 of the pointer 42 to be read therethrough. If desired, an indicating mark 47 may be located on the mounting member 40 adjacent the opening 48 for obtaining an accurate reading of the scale 46. A lock screw 49 is used to lock the pointer 42 in its desired position for reading the scale 46 when proper alignment positioning has been obtained.

The provision of the curved depression 13, shown in FIG. 6, along the length of the shaft 12 in combination with the opening or depression 35 in the flange plate 32, shown in FIG. 4, enables the proper angular relationship between the pointer 42 and the mounting bolts 38 of the flanged opening or outlet 60 to be maintained upon disassembly and reassembly of the protractor 10.

Referring now to FIGS. 1 and 2, the operation of the preferred embodiment of the subject invention will now be described in the environment of the construction of a spouting run for attachment to an outlet flange of a feed or grain distributor. The correct size flange plate 32 for mounting to the desired distributor outlet flange 60 is selected and inserted into the slot 21 of the turntable assembly 16 and locked in place by tightening the lock screw 34. The flange plate 32 is positioned in slot 21 so that the cut face portion 33 of the flange plate 32 is positioned away from the pointer 42. The flange plate 32 having the protractor assembly 10 secured thereto is bolted to the flange of the desired outlet of the distributor 50 by means of bolts 38. The resulting assembly will be as shown in FIG. 1. Correct alignment of the flange plate 32, outer retainer member 20 and the pointer 42 is assured by the opening or depression 35 in the flange plate 32 and the curved depression 13 in the shaft 12.

The desired axial length of the elbow to be constructed, shown in phantom at 51, is preset on the axial scale 14, and the lock screw 36 is tightened to lock the shaft 12 axially relative to the inner rotatable member 18. The length of the elbow 51 corresponds to the dimension Y shown in FIG. 1.

Locking screws 30 and 49 are loosened to allow rotation of the shaft 12 and inner rotatable member 18 relative to the stationary outer retaining member 20, and the pointer 42 relative to the shaft 12 and mounting member 40 about the pivot point 44, as shown in FIG. 2. The pointer 42 is then aimed directly toward the terminal destination of the spouting run, shown as a flanged elbow 62 in FIG. 1. If a flanged elbow, such as that shown at 62 in FIG. 1 is to be the terminal destination of the spouting run, the pointer 42 is aimed at the center of the opening of the flanged elbow 62 in order to obtain proper alignment and dimensioning of the elbow 51 and spouting run 61, shown in phantom in FIG. 1.

When the pointer 42 has been aligned with the terminal destination of the spouting run, the locking screws 30 and 49 are tightened to prevent rotational movement of the shaft 12 and pointer 42. The axial distance between the pivot point 44 of the protractor assembly 10 and the terminal destination of the spouting run 61 is then measured, this linear measurement being designated by the length L in FIG. 1. The angle in the horizontal plane which designates the angular location of the mounting flange holes for the elbow 51 is read from the scale 26 on the surface of the stationary outer retaining member 20, as shown in FIG. 3, this angle being designated as flange hole angle X. The angle of the elbow 51, designated as elbow angle Z is obtained by reading the scale 46 on the enlarged curved portion 43 of the pointer 42 through the window or opening 48, with each of these linear and angular dimensions being recorded. The flange plate 32 is then unbolted from the outlet flange 60 and the three-dimensional protractor assembly 10 is attached to the other outlets and the above described operation is then repeated.

Once the linear dimensions L and Y and angular dimensions X and Z are obtained, the downspout run or pipe 61 and the angled elbow 51 may be constructed at a remote location and will have dimensions which correspond exactly to the original dimensions obtained by using the three-dimensional protractor assembly 10, thus eliminating the need for using the trial and error method at the job location for the construction of a downspout pipe and elbow assembly.

The three-dimensional protractor of the present invention can also be used for constructing an angled downspout run from a single piece of pipe, is so desired. The linear and angular dimensions are obtained in the same manner as described above. The pipe to be cut is then scribed with a Curve-O-Marker or similar tool for marking a predetermined length Y and a predetermined angle to be formed on the end of the pipe. It should be noted that the pipe should be marked for cutting with an angle setting equal to one-half the angle read from the scale 46 of the pointer 42 of the three-dimensional protractor. After the pipe has been cut, the cut short piece having the length corresponding to the linear dimension Y is rotated 180° and is rewelded to the main length of pipe. The spout will now have an elbow having a length corresponding to the length Y and an angle corresponding to the angle Z of FIG. 1.

The main pipe is then cut to the length corresponding to the linear dimension L of FIG. 1, which is the overall length of the downspout run.

The correct size flange plate 32 is inserted into the slot 21 of the turntable assembly 16 and locked in place by lock screw 34. The three-dimensional protractor assembly 10 is then inserted into the elbow 51 of the spout, the shaft 12 and the pointer 42 now being positioned inside the pipe. A hole is cut in the back side of the elbow to allow a workman to sight along the pointer 42 to the center of the end of the pipe. When the pointer 42 is aligned correctly with the remote destination point, the flange is tack welded in place on the end of the elbow 51. The three-dimensional protractor assembly 10 is then removed and the welding of the flange to the end of the elbow 51 is completed. The hole cut from the back side of the elbow is then replaced by welding and the completed downspout bolted into place.

What is claimed is:

1. A three-dimensional protractor comprising a mounting means including a collar assembly having a mounting flange removably secured thereto, a shaft, said collar assembly including first means for rotatably supporting said shaft for rotation about the axis of said shaft and second means independent of said first means for slidably supporting said shaft for movement along the axis of said shaft in a longitudinal direction perpendicular to the plane of said mounting flange, a first angle indicating means on said mounting means for indicating the angular position of said shaft relative thereto, an aligning pointer pivotally attached to one end of said shaft, means for determining the linear distance between said mounting means and the pivot axis of said aligning pointer on said shaft, and second angle indicating means for determining the angle between said shaft and said aligning pointer, said aligning pointer comprising means for defining an unobstructed line of sight with a remote point when the pivot axis of the pointer is a predetermined distance from said mounting means so that a first angular relationship between said aligning pointer and said mounting means and a second angular relationship between said aligning pointer and said shaft may be determined.

2. A three-dimensional protractor as set forth in claim 1 wherein said collar assembly comprises an outer retaining member having an inner rotatable member positioned therein, said inner rotatable member having a bore therethrough for slidably receiving said shaft and said flange member being removably secured to said outer retaining member.

3. A three-dimensional protractor as set forth in claim 2 wherein said first angle indicating means comprises an angular scale indicia positioned on said outer retaining member and a pointer mark formed on said inner rotatable member for aligning with the angle indicia on said outer retaining member and locking means on said inner rotatable member for restraining said shaft from angular and sliding movement relative to said inner rotatable member.

4. A three-dimensional protractor as set forth in claim 1 wherein said means for determining the linear distance between said mounting means and said pivot axis of said aligning pointer comprises a linear scale formed axially along the length of said shaft.

5. A three-dimensional protractor as set forth in claim 1 wherein said second angle indicating means comprises an angular scale formed on said aligning pointer about the pivot axis of said pointer on said shaft, and a means for reading the angle formed between said pointer and said shaft indicated on said scale.

6. A three dimensional protractor as set forth in claim 1 further comprising locking means for preventing movement of said shaft relative to said collar assembly and said aligning pointer relative to said shaft.

* * * * *